Dec. 21, 1965   W. F. ROSSI ETAL   3,224,918
METHOD OF MAKING CONTAINERS
Original Filed Sept. 22, 1959   3 Sheets-Sheet 1

INVENTORS
WILLIAM F. ROSSI
PAUL O. HUSTON
BY
J. William Carson
ATTORNEY

Dec. 21, 1965   W. F. ROSSI ETAL   3,224,918
METHOD OF MAKING CONTAINERS
Original Filed Sept. 22, 1959   3 Sheets-Sheet 3
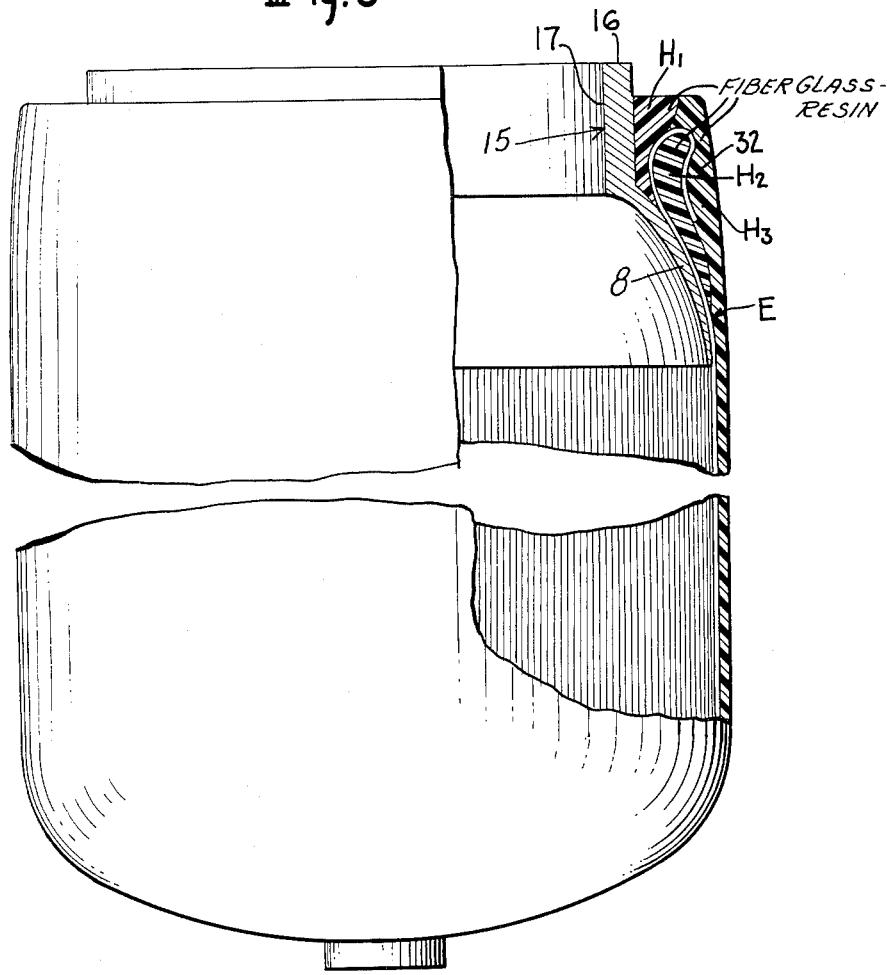
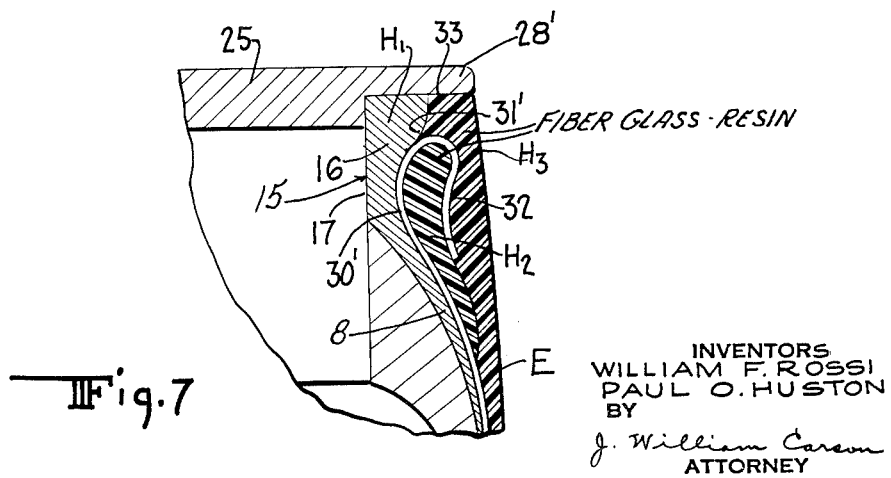
INVENTORS
WILLIAM F. ROSSI
PAUL O. HUSTON
BY
J. William Carson
ATTORNEY 3,224,918
METHOD OF MAKING CONTAINERS
William F. Rossi and Paul O. Huston, Bloomfield, N.J., assignors to Specialties Development Corporation, Belleville, Essex County, N.J., a corporation of New Jersey
Original application Sept. 22, 1959, Ser. No. 841,484. Divided and this application July 20, 1962, Ser. No. 211,298
6 Claims. (Cl. 156—175)

This application is a division of United States application Serial No. 841,484, filed September 22, 1959, now Patent No. 3,079,038, dated February 26, 1963.

The present invention relates to containers, and, more particularly, to a method of making generally cylindrical containers formed of a plurality of windings of resin impregnated yarn.

Heretofore, attempts have been made to construct generally cylindrical containers comprising a fitting at one end for connecting a valve or pipe, a wall member or another fitting at the other end, and windings of resin impregnated yarn such as fiber glass for building up the side wall structure of the container and to secure the fitting and the wall member to the side wall structure to provide a unitary, pressure resisting container. These attempts have not been completely successful because of the difficulties in securing the fitting and wall member and providing the side wall with longitudinal tensile strength to resist the service pressure of the medium confined in the container without resorting to a wall thickness which would increase the weight of the container beyond a permissible value.

Accordingly, an object of the present invention is to provide an improved method of making containers of the foregoing type.

Another object is to provide such a method wherein the windings are so arranged that the container is light in weight and has the required structural strength for its intended purpose.

A further object is to provide a method of making such containers which is simple, practical and economical.

Other and further objects of the invention will be obvious upon an understanding of the illustrative embodiment about to be described, or will be indicated in the appended claims, and various advantages not referred to herein will occur to one skilled in the art upon employment of the invention in practice.

In the drawings:

FIG. 6 is a longitudinal sectional view of the finished container apart from the winding apparatus with the form removed therefrom.

FIG. 7 is a fragmentary sectional view of a container similar to that shown in FIG. 6 wherein an end fitting is contoured to simulate the pad winding.

Figure 1:
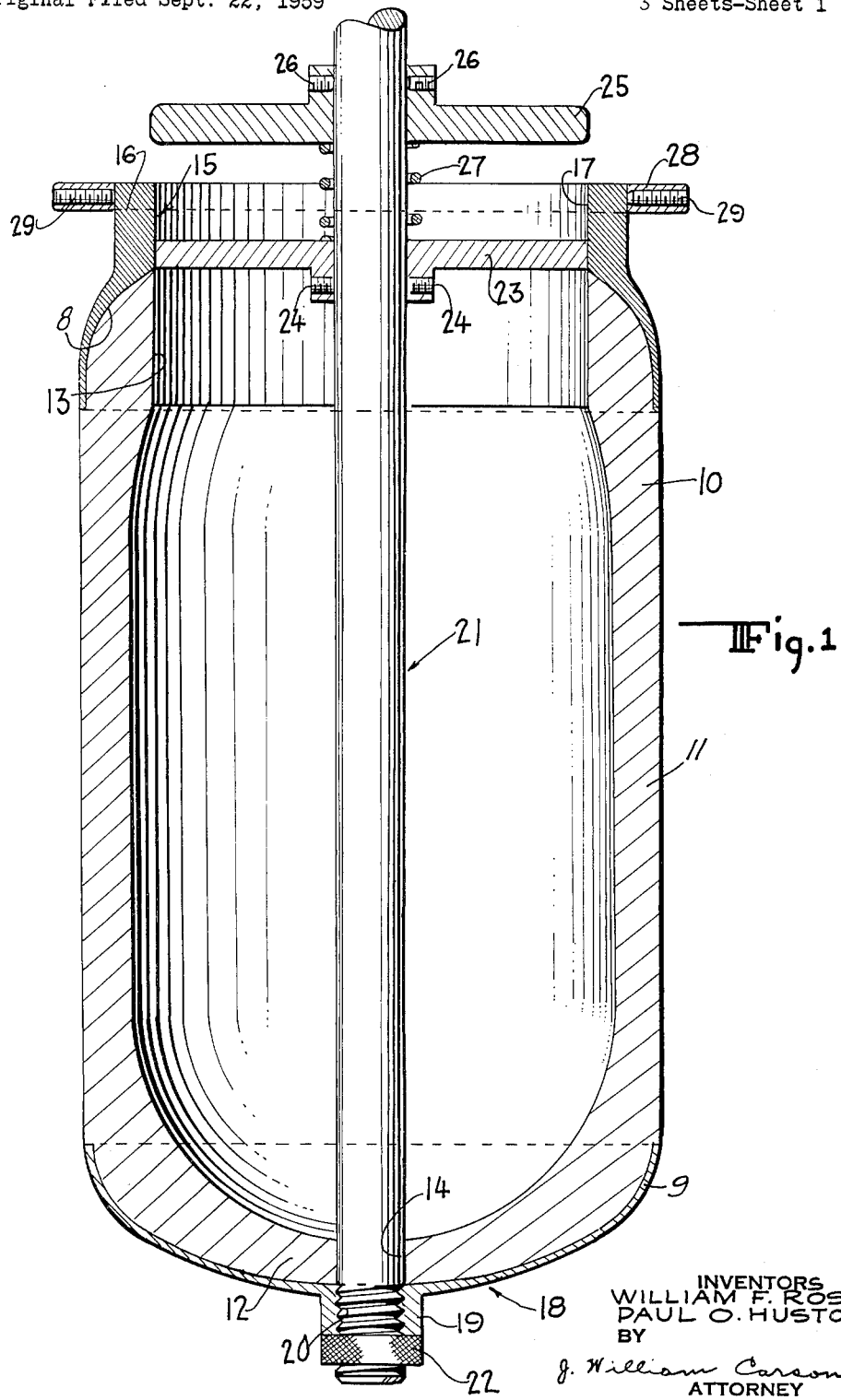
FIG. 1 is a longitudinal sectional view of a form supported on winding apparatus and having end fittings thereon over which the windings of resin impregnated yarn are applied.

Referring to the drawings in detail and more particularly to FIG. 1 thereof, there is shown a hollow, generally cylindrical form or mandrel 10 made of a low melting point alloy. The form has a cylindrical side wall 11, a generally hemispherical wall 12 at its lower end formed with a small opening 14, and has a large opening 13 at its upper end. An end fitting 15 has a depending flange 8 which is applied to the upper end of the wall 11, and has a cylindrical section 16 provided with an opening 17 which matches the opening 13 of the form. An end fitting 18 which is applied to the end wall 12 has an interiorly threaded outwardly extending spud 19 formed with a threaded opening 20 which matches the opening 14 of the form, and has an upwardly facing flange 9. If desired, the spud may extend inwardly and be disposed in the opening 14 of the form. The end fittings and the form are secured to and supported for rotation with a rotatable spindle or winding post 21 threaded into the spud 19 and having a nut 22 thereon and by a guide disc 23 inserted into the opening 17 of the cylindrical section 16 and secured to the spindle 21 by set-screws 24.

The drive mechanism for the spindle and the apparatus for applying hoop windings and end-over-end winding referred to hereinafter need not be shown herein because such mechanism and apparatus may be constructed in accordance with the teachings and suggestions found in United States Patent 2,858,992, Nov. 4, 1958.

In order to carry out the present invention, the spindle 21 is equipped with a plate 25 secured thereon by set-screws 26 to position the same adjacent and spaced from the opening 17 of the cylindrical section 16. This plate is adapted to be inserted into the opening 17 upon loosening the set-screws 26 to control the tensioning of a winding as described hereinafter. Movement of the plate 25 toward the opening may be resisted by a light spring 27 disposed between the disc 23 and the plate 25 when the set screws are loosened. Also, a flat ring 28 is placed on the cylindrical section adjacent its free end is secured thereto by set-screws 29 which serve to confine windings on the cylindrical section as described hereinafter.

Figure 2:
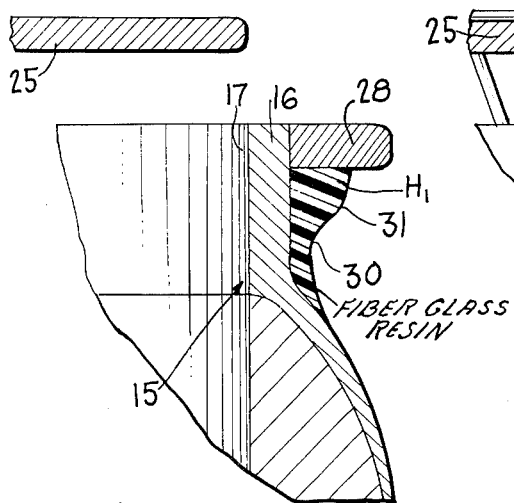
FIG. 2 is an enlarged fragmentary sectional view of an end fitting having a pad winding applied thereto.

In FIG. 2, a portion of the fitting 15 is shown with a continuous hoop winding $H_1$, applied to the cylindrical section 16 extending from the ring 28 to the upper portion of the flange 8 of the fitting. This winding is built up in layers to serve as a pad constituting a portion of the fitting 15 for ultimately receiving portions of end-over-end windings, as will be described hereinafter, and for this purpose the pad winding is contoured to provide an annular recess 30 adjacent the lower end and an annular bulge 31 adjacent the upper end. This winding is evenly tensioned and preferably comprises epoxy resin impregnated fiber glass yarn.

Figure 3:
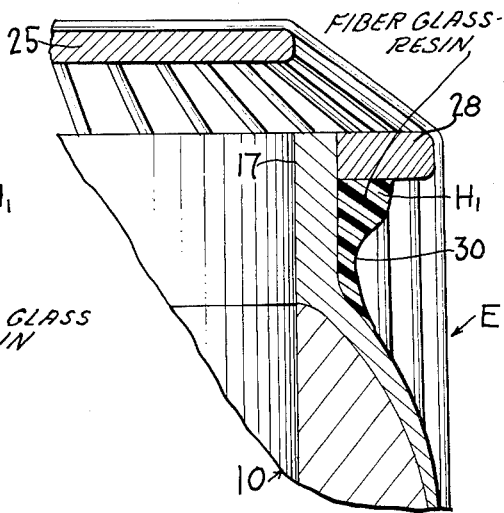
FIG. 3 is a view similar to FIG. 2 illustrating a longitudinal or end-over-end winding which is applied over the end fittings and the form.

In FIG. 3, an end-over-end winding E of longitudinally extending, substantially parallel strands is shown at the commencement of the winding thereof. The strands are wound under tension over the plate 25 and sufficient layers are wound to form generally hemispherical end wall structure over the end wall 12 and the side wall of the form 10 as shown in FIG. 6. This winding preferably comprises epoxy resin impregnated fiber glass yarn.

Figure 4:
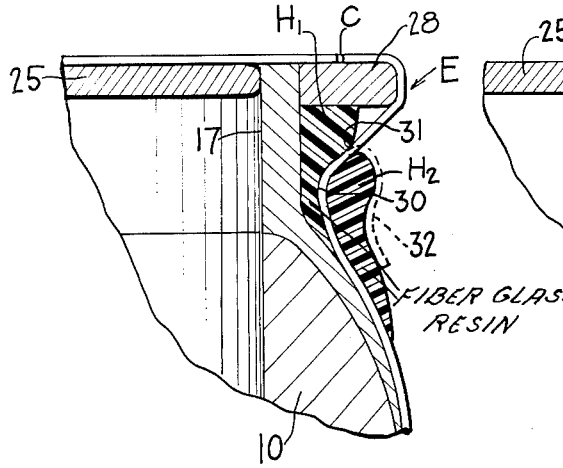
FIG. 4 is a view similar to FIG. 3 illustrating a trap winding for securing a portion of the longitudinal winding over the pad winding.

When the end-over-end winding E has been completed, the set-screws 26 are loosened and a continuous hoop winding $H_2$ is applied under tension about the annular zone of the end-over-end winding E adjacent the pad winding $H_1$ to draw this zone into the recess 30 and tension the same as the spring 27 yields and the plate 25 is moved into the opening 17, as shown in FIG. 4. Sufficient layers of this winding are provided to securely trap the drawn-in portion of the winding E. As shown, this trap winding increases in thickness from below the pad winding and is built up across the recess 30 to the bulge 31. Preferably, this winding comprises epoxy resin impregnated fiber glass yarn.

After the trap windings $H_2$ has been completed, as shown in FIG. 4, the end-over-end winding is cut along an annular path C to provide a tubular flap or sleeve 32 of a length sufficient to enable it to be folded back over the trap windings $H_2$ as shown in broken lines. In the illustrative embodiment, the flap has the desired length if the path, along which the winding E is cut, is disposed at about the midpoint between the inner and outer edges of the ring 28. The cutaway portions of the end-over-end winding are discarded.

Figure 5:
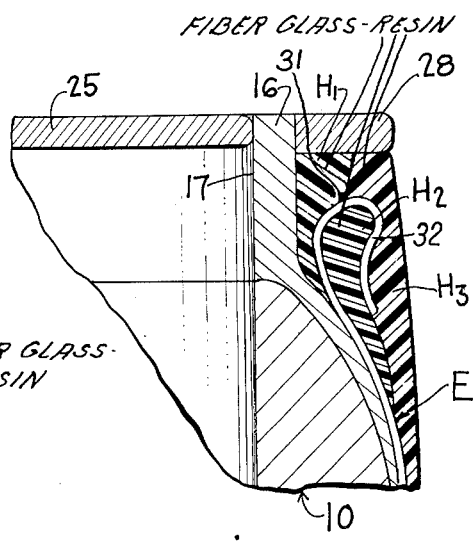
FIG. 5 is a view similar to FIG. 4 illustrating a finishing hoop winding which is applied onto a portion of the pad winding, a folded over portion of the longitudinal winding, and the form to provide side wall structure.

As shown in FIG. 5, the flap 32 is secured over the trap windings $H_2$ by a continuous hoop winding $H_3$ which fills the space between the ring 28, the bulge 31 and the fold of the flap; covers the flap; and extends over the end-over-end winding to the end wall structure (FIG. 6). This winding preferably comprises epoxy resin impregnated yarn.

In FIG. 6, the completely wound container is shown apart from the ring 28, the plate 25 and the winding post 21, and with the resin cured and the form 10 melted out to provide the finished container wall structure. By using the flat ring 28 to confine the upper end of the windings $H_1$, and $H_3$, a smooth, horizontal, annular surface 33 is provided just below the free end of the cylindrical section 16.

As shown in FIG. 7, the pad winding $H_1$ may be dispensed with by utilizing a fitting 15 having a cylindrical section 16 formed with a recess 30' and a bulge 31'. Also, the ring 28 can be dispensed with by providing the tension plate 25 with an outer section 28' of reduced thickness which overlies the free end of the cylindrical section 16 and extends outwardly thereof when the plate proper is inserted into fitting opening 17 upon completion of the trap winding $H_2$. The plate section 28' is then positioned to serve as a means for confining the upper end of the finished wind $H_3$ to provide a surface 33' which is flush with the upper edge of the cylindrical section.

If desired, both ends of the container could be provided with a large opening by modifying the winding post so that a disc 23 is in driving connection with the form 10 at both ends thereof, for example at the wall of the opening 13, and having a fitting 15, a plate 25, a spring 27 and a ring 28 or 28' at both ends.

The container as illustrated in its preferred form is particularly useful as a rocket case which has a high strength for weight ratio.

From the foregoing description, it will be seen that the present invention provides an improved method of making containers wherein the upper ends of an end-over-end winding are firmly secured under tension to withstanding longitudinal stresses and the last hoop winding is arranged to bind in the end-over-end winding withstand radial stresses. In this manner, a strong generally cylindrical container is provided which is particularly suitable where a large opening is required at one or both ends thereof.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. The method of making a generally cylindrical container having a fitting at one end, which method comprises forming an end-over-end winding of longitudinally extending, substantially parallel strands providing side wall structure for the container and a cap portion over the fitting; cutting the cap portion to provide a sleeve extending longitudinally outwardly of the side wall structure; forming first hoop windings on the inner portion of the sleeve to cause the same to overlie the fitting and be secured thereto; folding the outer portion of the sleeve over the first hoop windings and forming second hoop windings on the folded over portion to further secure the sleeve to the fitting and forming the second hoop winding on the longitudinally extending portions of the strands to provide additional side wall structure.

2. The method of making a generally cylindrical container on a form having a fitting at one end, which method comprises forming an end-over-end winding on the form including longitudinally extending, substantially parallel strands providing side wall structure for the container and a cap portion over the fitting; cutting the cap portion and shaping the same to provide a sleeve extending longitudinally outwardly of the side wall structure; forming first hoop windings on the inner portion of the sleeve to cause the same to overlie the fitting and be secured thereto; folding the outer portion of the sleeve over the first hoop windings; and forming second hoop windings on the folded over portion to further secure the sleeve to the fitting and forming the second hoop winding on the longitudinally extending strands to provide additional side wall structure.

3. The method of making a generally cylindrical container, which method comprises placing an end fitting on one end of a cylindrical form having a collar formed with an opening; placing a ring adjacent the opening of the collar; applying a first hoop winding on the collar abutting the ring which is contoured to form an annular arcuate recess therein; placing a plate adjacent and spaced from the opening; applying a longitudinally extending end-over-end winding over the form, the end fitting, the ring and the plate to provide side wall structure; applying a second hoop winding over the end-over-end winding at the recess to draw portions of the end-over-end winding into the recess while tensioning the end-over-end winding; cutting the end-over-end winding in an annular path to provide a tubular flap extending longitudinally outwardly of the second hoop winding; folding the flap to place it over the second hoop winding; applying a third hoop winding over the flap to secure the flap and over the side wall structure to provide additional side wall structure; removing the ring and the plate; and removing the form.

4. The method of making a generally cylindrical container, which method comprises placing an end fitting on one end of a cylindrical form having a collar formed with an opening; placing a ring on the collar adjacent the opening; applying a first hoop winding on the collar abutting the ring which is contoured to form an annular arcuate recess therein; placing a circular plate adjacent and spaced from the opening and disposed, in a plane intersecting the longitudinal axis of the form at right angles; applying a longitudinally extending end-over-end winding over the form, the end fitting, the ring and the plate to provide side wall structure; applying a second hoop winding over the end-over-end winding at the recess to draw portions of the end-over-end winding into the recess while tensioning the end-over-end winding with the plate; cutting the end-over-end winding in an annular path located inwardly of the outer periphery of the ring to provide a tubular flap extending longitudinally outwardly of the second hoop winding; folding the flap to place it over the second hoop winding; applying a third hoop winding over the flap to secure the flap and over the side wall structure to provide additional side wall structure; removing the ring and the plate; and removing the form.

5. The method of making a generally cylindrical container, which method comprises placing an end fitting on each end of a cylindrical form, at least one of the end fittings having a collar formed with an opening; placing a ring on the collar adjacent the opening; applying a first hoop winding on the collar abutting the ring which is contoured to form an annular arcuate recess therein; placing a plate adjacently spaced from the opening and disposed, in a plane intersecting the longitudinal axis of the form at right angles; applying a longitudinally extending end-over-end winding over the form, the end fittings, the ring and the plate to provide side wall structure; applying a second hoop winding over the end-over-end winding at the recess to draw portions of the end-over-end winding into the recess while tensioning the end-over-end winding with the plate; cutting the end-over-end winding in an annular path to provide a tubular flap extending outwardly of the second hoop winding; folding the flap to place it over the second hoop winding; applying a third hoop winding over the flap to secure the flap and over the side wall structure to provide additional side wall structure; removing the ring and the plate; and removing the form.

6. The method of making a generally cylindrical container, which method comprises placing an end fitting on one end of a cylindrical form having a collar formed with an external annular recess and an opening; placing a ring adjacent the opening of the collar; placing a plate adjacent and spaced from the opening; applying a longitudinally extending end-over-end winding over the form, the end fitting, the ring and the plate to provide side wall structure; applying a first hoop winding over the end-over-end winding at the recess to draw portions of the end-over-end winding into the recess while tensioning the end-over-end winding; cutting the end-over-end winding in an annular path to provide a tubular flap extending longitudinally outwardly of the first hoop winding; folding the flap to place it over the first hoop winding; applying a second hoop winding over the flap to secure the flap and over the side wall structure to provide additional side wall structure; removing the plate; and removing the form.

References Cited by the Examiner
UNITED STATES PATENTS
1,795,388    3/1931    Dumat _____ 220—3

ALEXANDER WYMAN, *Primary Examiner.*

EARL M. BERGERT, *Examiner.*